(12) United States Patent
Ytterland et al.

(10) Patent No.: US 7,681,528 B2
(45) Date of Patent: Mar. 23, 2010

(54) FISH NETPEN

(75) Inventors: Anders Ytterland, Trondheim (NO);
Endre Kvalheim, Trondheim (NO)

(73) Assignee: Byks AS, Trondheim (NO)

( * ) Notice: Subject to any disclaimer, the term of this patent is extended or adjusted under 35 U.S.C. 154(b) by 0 days.

(21) Appl. No.: 10/544,690

(22) PCT Filed: Feb. 6, 2004

(86) PCT No.: PCT/NO2004/000035
§ 371 (c)(1),
(2), (4) Date: Aug. 5, 2005

(87) PCT Pub. No.: WO2004/073396
PCT Pub. Date: Sep. 2, 2004

(65) Prior Publication Data
US 2006/0096548 A1    May 11, 2006

(30) Foreign Application Priority Data
Feb. 6, 2003    (NO) ................................. 20030592

(51) Int. Cl.
*A01K 63/02* (2006.01)
(52) U.S. Cl. .................................................. 119/203
(58) Field of Classification Search ................. 119/203, 119/221, 215, 223, 230, 240, 216, 239, 238
See application file for complete search history.

(56) References Cited

U.S. PATENT DOCUMENTS

| | | | | |
|---|---|---|---|---|
| 2,809,448 A | * | 10/1957 | Oestergaard et al. | 434/145 |
| 3,704,687 A | * | 12/1972 | Nohmura | 119/221 |
| 3,741,159 A | * | 6/1973 | Halaunbrenner | 119/240 |
| 4,257,350 A | * | 3/1981 | Streichenberger | 119/223 |
| 4,312,296 A | * | 1/1982 | Stelleman et al. | 119/223 |
| 4,982,697 A | * | 1/1991 | Neff | 119/200 |
| 5,172,649 A | * | 12/1992 | Bourgeois | 119/223 |
| 5,227,055 A | * | 7/1993 | Timmons | 210/151 |
| 5,251,571 A | * | 10/1993 | Willinsky et al. | 119/215 |
| 5,299,530 A | * | 4/1994 | Mukadam et al. | 119/223 |

(Continued)

FOREIGN PATENT DOCUMENTS

FR    2420920 A    10/1979

(Continued)

*Primary Examiner*—Timothy D Collins
*Assistant Examiner*—Valentina Xavier
(74) *Attorney, Agent, or Firm*—Lahive & Cockfield, LLP; Anthony A. Laurentano

(57) ABSTRACT

A netpen for breeding, storage or transport of fish in the sea, in particular completely or in part in open sea regions outside the skerries is provided. The netpen may be lowered in the sea to a desired depth. The netpen may be elevated to a half or approximately half submerged state for various work operations, such as maintenance and inspection of the netpen or harvesting. The netpen has a substantially spherical geometry. The netpen consists of a framework of stays, a horizontal through center pole also serving as a buoyancy adjusting element for elevation and lowering of the netpen, a horseshoe-shaped working platform having an integrated dock for working vessels. The entire working platform including dock is liftable and lowerable through buoyancy adjustment using a designated element. The working deck is mounted on an extended axle on the center pole. The netpen may be rotated inside said working deck.

14 Claims, 12 Drawing Sheets

U.S. PATENT DOCUMENTS

| | | | |
|---|---|---|---|
| 5,429,074 A * | 7/1995 | Nelson et al. | 119/239 |
| 5,628,279 A * | 5/1997 | Bones, IV | 119/215 |
| 5,713,303 A * | 2/1998 | Willinsky et al. | 119/218 |
| 5,769,027 A * | 6/1998 | Adams et al. | 119/238 |
| 5,979,363 A * | 11/1999 | Shaar | 119/230 |
| 2005/0229864 A1 * | 10/2005 | Chanceaulme Willemsen et al. | 119/230 |

FOREIGN PATENT DOCUMENTS

| WO | WO-82/03152 | 9/1982 |
|---|---|---|

\* cited by examiner

US 7,681,528 B2

FISH NETPEN

RELATED APPLICATIONS

This application is a 35 U.S.C. 371 national stage filing of International Application No. PCT/NO2004/000035 filed on 6 Feb. 2004, which claims priority to Norwegian Patent Application No. 2003 0592 filed on 6 Feb. 2003 in Norway. The contents of the aforementioned applications are hereby incorporated by reference.

FIELD OF THE INVENTION

The present invention relates to a netpen or enclosure for breeding, storage, or transport of fish in the sea. More particularly, the netpen of the present invention is designed for use in open sea regions outside the skerries, where the environmental loads are much greater than in fjords and other regions in sheltered waters. The netpen may be let further down in the water when needed in order, for example, to protect the fish during algal invasions, temperature variations, etc., and to protect the installation and the fish from destructive wave forces at the surface. Further, the netpen may be elevated to a semi-submerged state for maintenance, inspection, or harvesting, and the ability of the netpen to rotate, as well as its docking station for vessels and personnel working platform, will help enabling maintenance operations and harvesting to be carried out in an efficient and safe manner.

BACKGROUND OF THE INVENTION

During the past 30 years, marine breeding has seen a formidable growth through establishment in countries naturally suited for fish farming, such as Norway, Chile, Canada, Ireland, and Japan. These countries have been able to offer easily accessible fish farming localities being well protected from the most wearing environmental forces in their long fjords, bays, or other regions of sheltered waters. Today, the aquaculture industry in these countries has grown to become a very successful industry.

In the last few years, several expert groups have concluded that the international growth potential for the industry is huge. This is the case not only for those breeds that are already being raised, but nonetheless for new breeds that will gradually grow to become successful commercial products. Moreover, it is also expected that the demand for fish and fish products will increase as a result of the rapid population growth. Internationally, among experts, it is commonly agreed upon that the main growth in the world's fish production must occur within sea farming, as the total take in the fisheries are approaching an upper defensible limit of about a 100 million tons per year.

An absolute requirement for further growth within the aquaculture industry is that the production capacity can be increased, and then for more breeds of farmed fish. With the current situation for the international fish farming industry, the potential for increasing the production capacity is very limited. This is due to the global lack of available sheltered inner coastal areas, and to that the existing technology is unable to provide for an efficient, safe, and profitable fish farming in open sea regions.

With the existing technology, coastal states without any form of, or with limited access to inner sheltered sea regions, are not able to develop large scale marine breeding. Existing fish farming installations commonly have a very simple configuration, generally including a seine freely suspended from a framework on the surface. Even at relatively slow current velocities however, the seines of these netpens undergoes appreciable deformations. At more exposed localities, the deformations may become severe. In addition, maintenance work and harvesting generally are both time consuming as well as expensive. Huge, heavy, and unmanageable seines also present a problem in connection with cleaning, impregnation, and replacement of the seine, as well as during harvesting. If the seine becomes damaged or worm, it is necessary to replace the entire seine or to bring it onshore for repair, which also involves removing the fish from the netpen. Furthermore, some maintenance operations require that parts of the work are performed under water, necessitating the use of expensive divers. This work is potentially dangerous.

The existing fish farming industry also has a problem in that diseases, infections, algal invasions, and various natural phenomena, such as "Super Chill", air horns, and the like put stress on and kill the farmed fish, which every year brings along great losses for the breeders. The cause of these problems is a combination of insufficient technology, the fish farming localities, and natural phenomena. Open sea breeding as such can be beneficial to the fish. Increased current velocity will ensure a good water throughput rate in the netpen, result in a greater oxygen uptake and better trim for the fish, as well as an increased water replacement and thereby less fouling inside the netpen. In addition, the water temperature and salinity are generally more stable in the open sea outside the skerries. These are all factors that might improve the welfare, health and reproduction of the fish.

Outside the fish farming installations, the environment is contaminated by debris or waste, such as fodder residues and excrements from the farmed fish. Such waste (nutrients) accumulates in such big amounts that it is effectively pollution, and is thereby a problem both for marine animals as well as for human beings that travel in the sheltered water regions. In addition, many people also find the fish farming installations visually offensive.

Besides contributing to free up regions in sheltered waters and reduce the area conflicts, open sea fish farming also will provide beneficial environmental effects. Larger water depths, more rapid currents, and a greater distance to the shore will result in a reduction of the contamination of the sea floor and the inshore zone, as well as in a relief of the threat against wild extermination-threatened fish breeds, such as the wild salmon, for example.

As a consequence of the above problems, many people are convinced that the most important factor for a future sustainable growth within the aquaculture industry will be the ability to establish fish farms in the open sea outside the skerries. This would make possible the operation of a sound breed of a larger number of fish species in more countries, regardless of whether or not the particular country has access to a sheltered coastline.

Internationally, several attempts have been made at providing fish farming installations intended for deployment in open sea. Unfortunately however, none of these attempts have resulted in a commercially viable installation for operationally efficient, safe, and profitable fish farming outside the skerries. A few of the installations have had a limited commercial success however, although in more sheltered regions. The present situation confirms this in that the occurrence of open sea fish farms is in fact very limited, in spite of the fact that states having an exposed coastline have expressed high ambitions of running a large scale fish farming. Generally, the previous attempts at establishing open sea fish farming installations have failed because the installations have suffered from one or more essential shortcomings preventing a safe, ethical, and economically lucrative fish breeding. The most successful approach to an open sea fish farming installation is believed to be an installation provided by the American company Ocean Spar Technologies, disclosed in the U.S. Pat. No. 5,617,813. This installation has been used for fish farming in, among other countries, Hawaii, Ireland, and the United States of America. However, even though the installation has been utilized for raising a few broods of fish, it does by no means provide any substantial contribution to the large-scale establishment of aquaculture industry in the open seas outside the skerries. The shortcomings of the installation are, among other things, that it is difficult to maintain as much work must be performed under water by divers, that it is difficult to harvest the fish, that one has poor visual control of the fish from the surface, that it is impossible to dock to the installation with larger boats without damaging the installation, that the seine needs to be cleaned under water, that each day dead fish must be picked up by divers, and that the installation is limited in depth to about 35 meters, owing to the divers.

The U.S. Pat. No. 4,312,296 describes a spherical netpen. This installation never became a commercial success. The netpen is very small, having a volume of about 1200 m³. The construction is composed of aluminum stays and a grating or lattice. Aluminum as construction material is very rigid and brittle, and therefore susceptible to fatigue, which is unfavorable when the concept is to be implemented offshore, where the environmental loads are continual, cyclic, and large. In addition, this installation may only be lowered to slightly below the surface, and is thus exposed to considerable wave loading.

Moreover, the installation neither includes a working platform for personnel nor a docking station for boats.

The U.S. Pat. No. 4,312,296 relates to a spherical netpen having a vertically extending center pole.

The PCT application WO 92/03921, like the U.S. Pat. No. 4,312,296, relates to a spherical netpen having a through center pole. This netpen obviously bear close resemblances to the one in the above patent, both the construction material and the arrangement for buoyancy control through separate floatation bodies in each end of the center pole being identical.

The U.S. Pat. No. 5,617,813 relates to a netpen having a vertical center pole, as well as a weighting organ attached thereto.

Even today, examples are found of netpens that are being used for other purposes than fish farming, such as for storing various kinds of wild fish. The most common case is that inshore fishermen store the fish in netpens while awaiting delivery to an onshore reception facility. It can be easily appreciated that this use of netpens would be much more widespread if cost effective, efficient and enduring netpens became available for use in open sea. A future scenario could be that fishing boats deliver their catch, or parts thereof, on a regular basis to huge netpens by the fish fields outside central marketing places, thereby making it possible both to adapt to the current demand and to at any time deliver ultra fresh, or even living fish. A netpen having a permanently outstretched seine could also be used in transporting huge amounts of living fish. Currently, huge amounts of living fish are being transported in fish carrier boats or seine bags. However, a problem associated with such transport is that the fish are put under stress due to a large density of fish per m³. Transporting fish in a permanently outstretched netpen will not put the fish under the same stress, making it feasible to transport the fish over great distances, such as tuna fish from Europe to Japan, for example.

SUMMARY OF THE INVENTION

Hence, a need exists for a fish farming installation that is suited for operation in a marine environment corresponding to open sea regions outside the skerries, wherein good conditions can be maintained for fish and installation continuously throughout the year, and wherein good working conditions for personnel is maintained with sufficient continuity so that the breeding can be carried out efficiently and safely as an all-year activity. Preferably, it should be possible to let the installation downwards in the water in order to avoid toxic algae and to protect the installation and the fish during extreme weather conditions. Further, the installation must be constructed in a manner that enables all operational tasks to be carried out in an efficient and safe manner, and the installation must have a size that is sufficient to allow for commercial breeding and other activity to be carried on with a good profitability.

DETAILED DESCRIPTION OF THE PREFERRED EMBODIMENT

Figure 1:
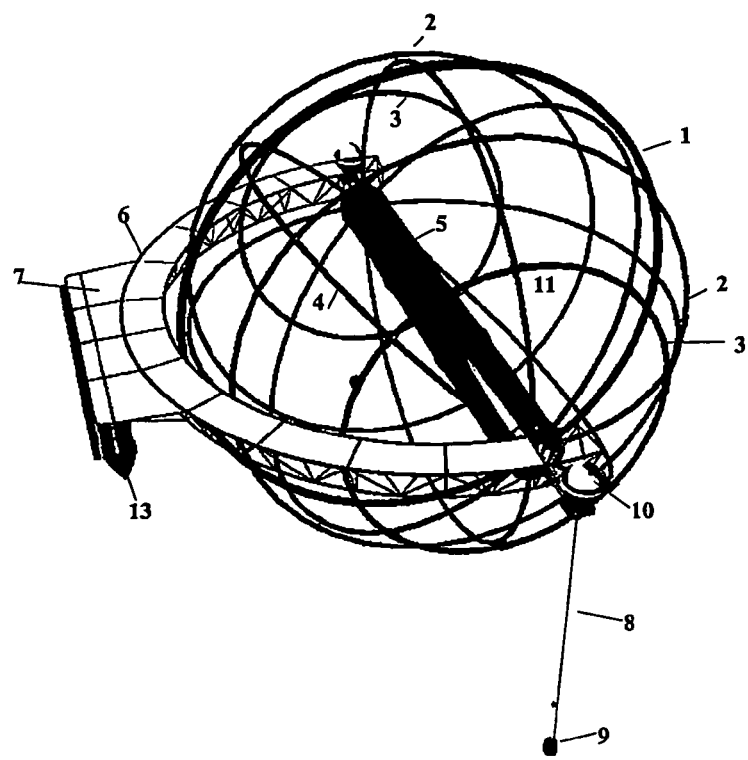
FIGS. 1, 3, and 4 show the netpen without a seine from different angles, depicted in a view diagonally from above, in a side view, and in a front view, respectively. The netpen is partially encircled by a horseshoe-shaped working deck 6. The buoyancy adjustment for the netpen occurs in the center pole 5, which extends transversally across the netpen, while the buoyancy adjustment for the working platform 6 is controlled by the same center pole in addition to the stay 13, which could be a tube, for instance. The working deck 6 is in horizontal position only when the netpen is semi-submerged for maintenance purposes.
Figure 2:
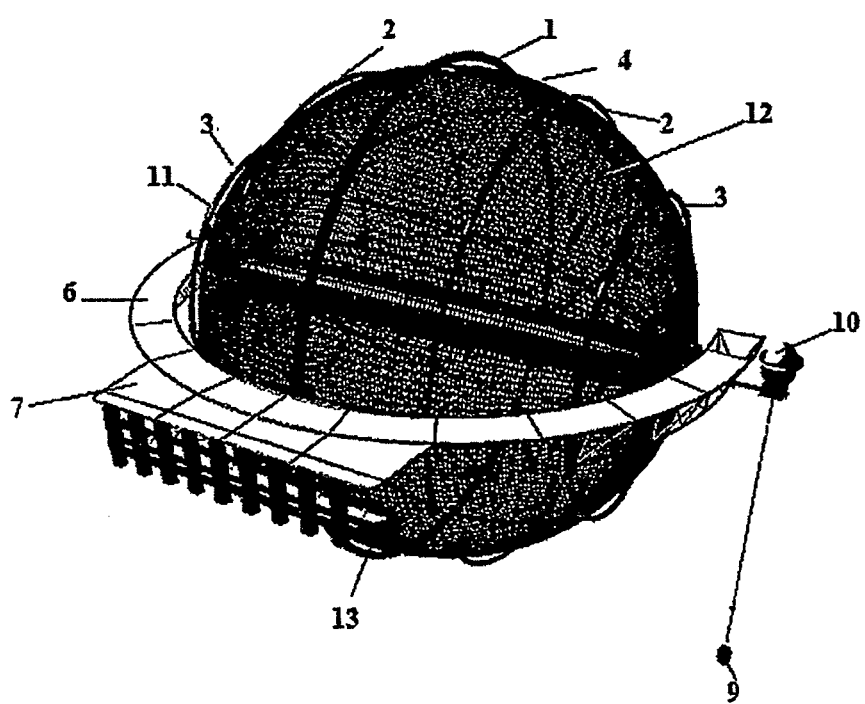
FIG. 2 shows the netpen covered with a seine 12.
Figure 3:
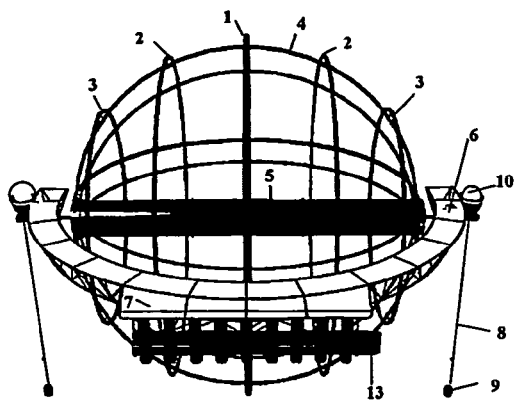
Figure 4:
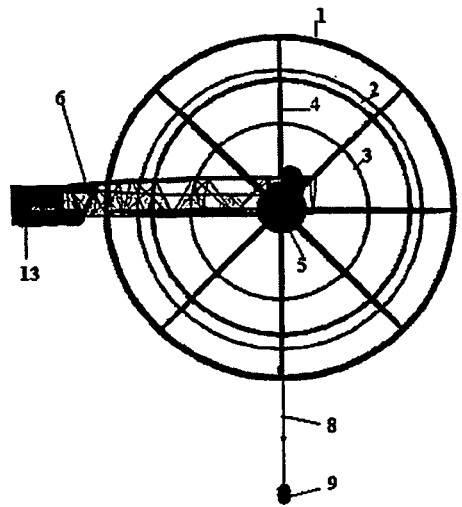
Figure 5:
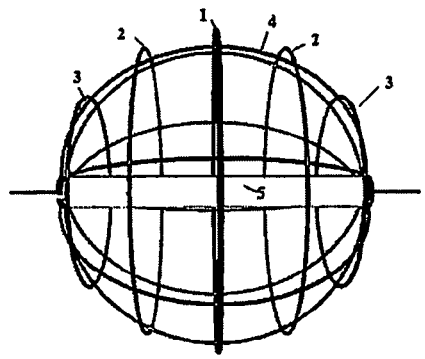
FIGS. 5 and 6 show the configuration of the framework and center pole 5 of the netpen, depicted in a side view and a front view, respectively. The netpen consists of centre stays 1, intermediate stays 2, polar stays 3, tie bars 4, and the center pole 5.
Figure 6:
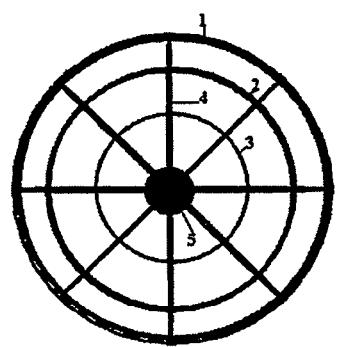

FIGS. 1 and 2 show a possible embodiment of the invention. In the construction shown, the netpen framework is composed of tubular polyethylene stays 1, 2, 3, and 4, and a tubular steel center pole 5. The center pole may also be constructed of another rigid and strong material. The stays may be tubular, solid, or have another geometrical shape, such as quadrilateral. Polyethylene, as the material is referred to herein, is also intended to include other plastic materials bearing a close resemblance to polyethylene. Further included are polyethylene or polyethylene-like materials containing a certain amount of other constituent materials, such as fiber or fiber-like materials, e.g. carbon fiber.

Figure 25:
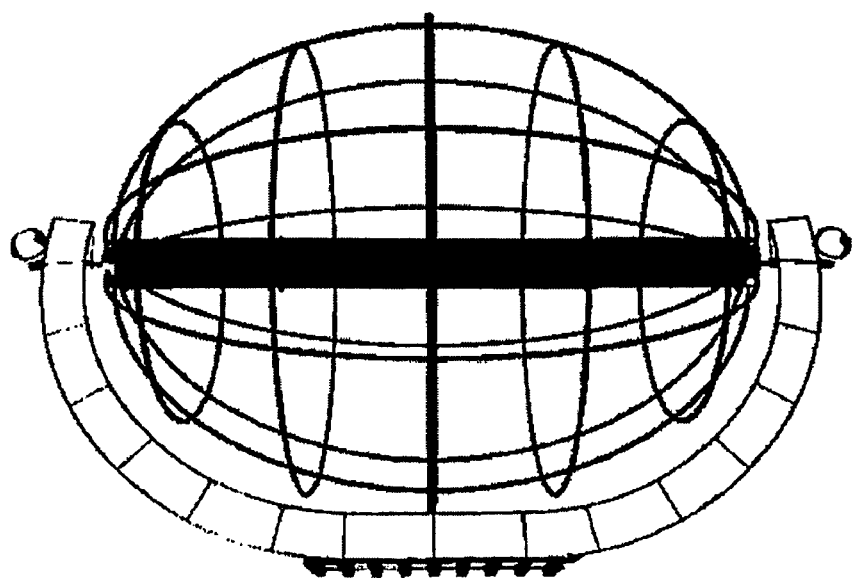
FIGS. 25 and 26 show two alternative netpen designs in a view diagonally from above.
Figure 26:
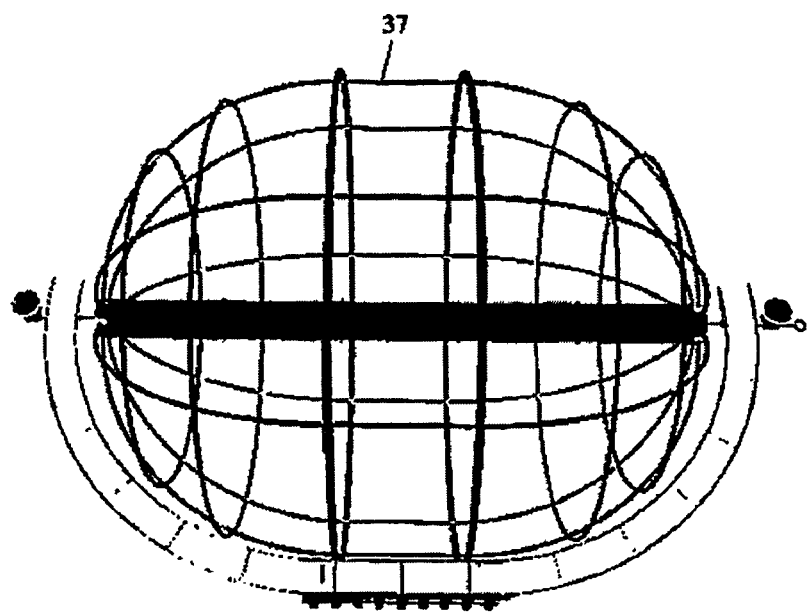
Figure 27:
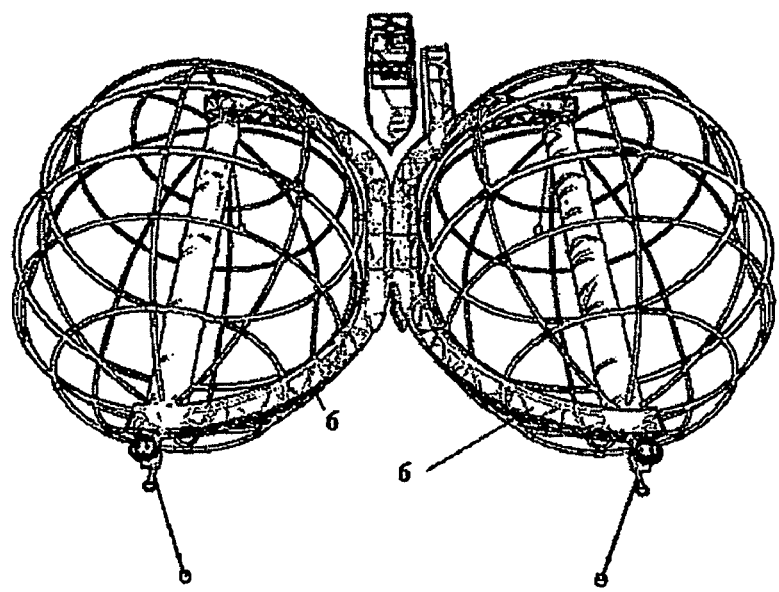
FIG. 27 shows two netpens connected through the working deck 6.
Figure 28:
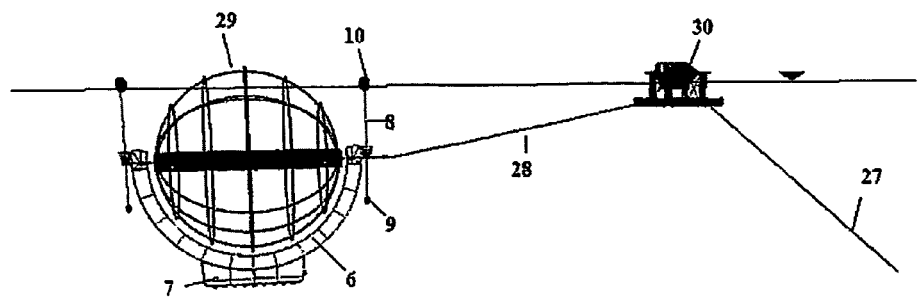
FIG. 28 shows the positioning of the netpen 29 and the energy station 30 relative to the water surface and the anchoring 27 and 28.
Figure 29:
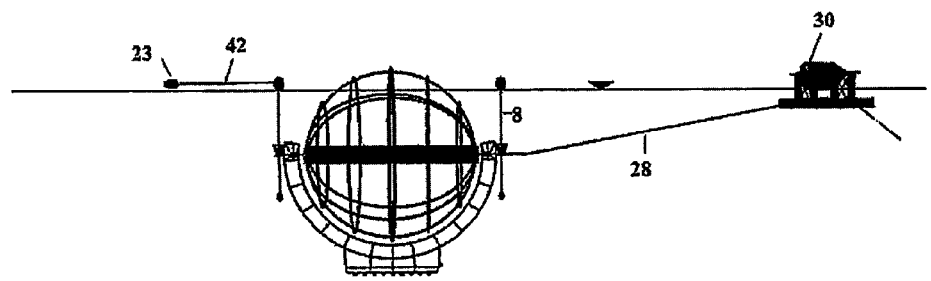
FIG. 29 shows the netpen with an additional buoy 23 having a fixed permanent buoyancy. In the surface position of the netpen, this buoy will float freely tied to the netpen. In this position, the buoy serves no important purpose; not until the netpen is fully submerged the buoy 23 will contribute to the stabilization of the netpen, see FIG. 30.

The framework of FIGS. 1-6, when covered by the seine 12, forms a closed netpen, as shown in FIG. 2. The framework is built up of center stays 1, intermediate stays 2, polar stays 3 and tie bars 4. A possible design is shown in FIGS. 1-6, including one center stay, two intermediate stays, two polar stays, and eight tie bars. However, a lower or higher number of tie bars and vertical stays is also contemplated. Two alternative designs for the netpen framework are shown in FIGS. 25 and 26. These are two possible ways of increasing the volume of the spherical netpen without increasing the height (diameter) of the spherical netpen, while at the same time the deviations from the spherical shape are not greater than that most of its properties, e.g., with respect to symmetrical load distribution and rotatability, is maintained. Further, each single stay could be composed of several connected smaller stays. For instance, the center stay could be made up of two or more stays that are welded or otherwise coupled together. The stays that are included the framework are welded or otherwise coupled together in such a manner that they form a spherical or substantially spherical structure. In this connection it may be noted, for example, that the plastic rings of the structure not necessarily need to be perfectly circular; instead, they could have an oval or substantially oval-cross section, and be shaped as a polygon having many straight or substantially straight sides.

Figure 7:
FIG. 7 shows a possible embodiment of the center pole 5, having three separate compartments for buoyancy adjustment.
Figure 8:
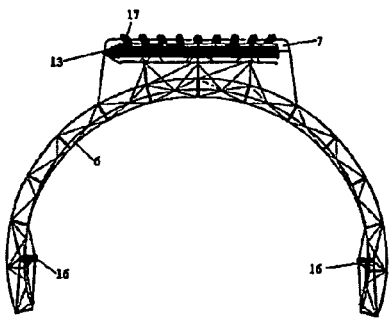
FIG. 8 shows the horseshoe-shaped working deck 6 viewed from above. The deck itself will be dressed with a grating, which is not depicted in the drawing.
Figure 9:
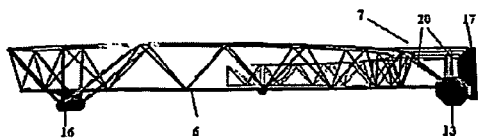
FIG. 9 is a side view showing the working deck 6 and the docking station 7. The drawing depicts a possible truss for the working deck 6, the slide bearings 16 that are attached to the center pole 5, and the stay 13 for adjusting the buoyancy of the working deck and the docking station.
Figure 10:
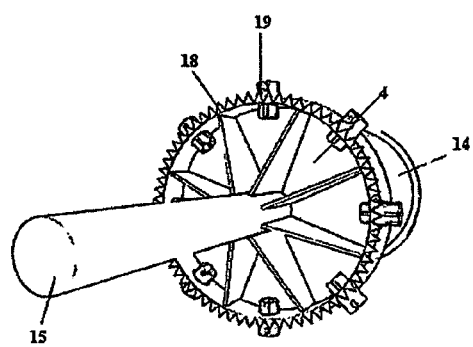
FIG. 10 shows a possible embodiment of the terminal unit 14 of the center pole 5, including a gear rim 18 for power transmission during rotation of the netpen, a rotary shaft 15, and bushing collars 19.
Figure 11:
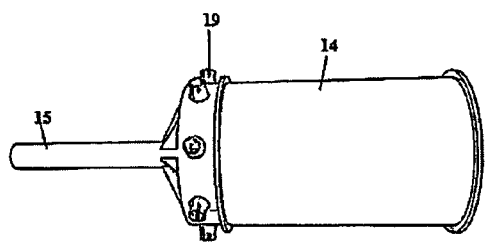
FIG. 11 shows the terminal unit 14 in a side view, not including the gear rim 18 but including the bushing collars 19 and the rotary shaft 15.
Figure 12:
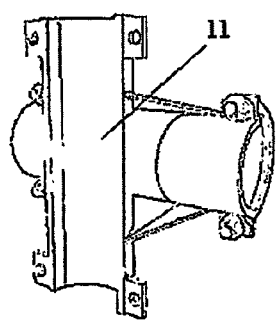
FIG. 12 shows a possible embodiment of the connection points 11 between the tie bars and all the vertical stays of the netpen framework.
Figure 13:
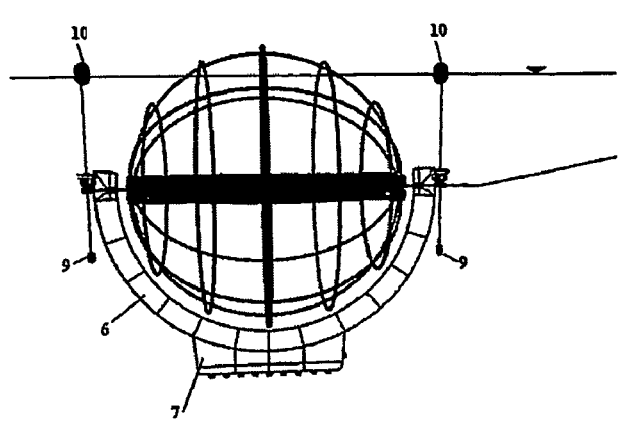
FIG. 13 is a side view showing the netpen in a surface position. About ¹⁄₁₀ of the netpen diameter extends above the water surface. Reserve floatation buoys 10 with weighting organs 9 are provided at the front and the back of the netpen.

Across the netpen there extends a rigid center pole 5, FIG. 7. All the tie bars 4 are connected to the center pole 5 at the terminal units 14 (FIGS. 10 and 11). The vertical stays can be coupled to the tie bars, for example, by a connection 11 as shown in FIG. 12. Seven of the tie bars 4, and all the vertical stays 1, 2, and 3, are preferably open, so that water freely can enter into and exit these stays.

However, these stays may also be used for buoyancy adjustment in that water is taken in or expelled by means of pressurized air through valves provided in the stays to one or more separate chambers. The center pole 5 is the load-bearing member for the entire structure. The pole ensures that the shape of the netpen is maintained even under extreme loads, and also controls the buoyancy of the overall structure and connects the netpen with the working platform 6. The actual buoyancy adjustment is achieved in that the center pole 5 is divided into multiple chambers (see FIG. 7) filled with either water or air. The regulation of these chambers is performed either manually from the energy station 30 or by remote control.

Figure 30:
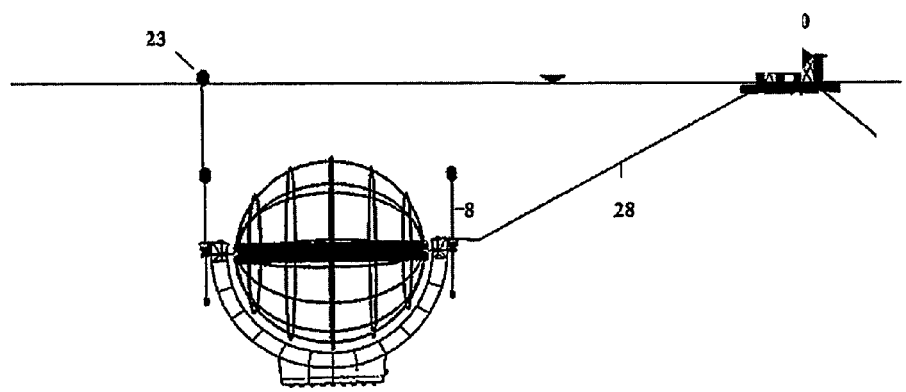
FIG. 30 shows how the stability and depth adjustment of the netpen are attended to in a fully submerged position by means of an additional buoy 23 and the reserve buoyancy of the energy platform 30.
Figure 31:
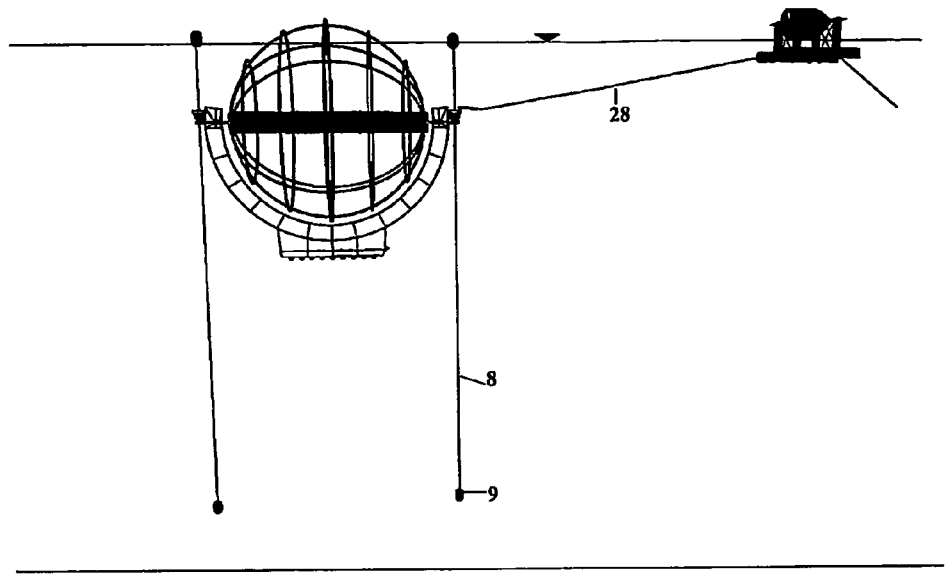
FIGS. 31 and 32 show an alternative approach to provide for the stability and depth control of the netpen. From the netpen there are suspended two long lines 8 with weighting organs 9, which at a given depth will contact the sea floor, whereupon the weight release will cause the netpen to stabilize at a given depth.
Figure 32:
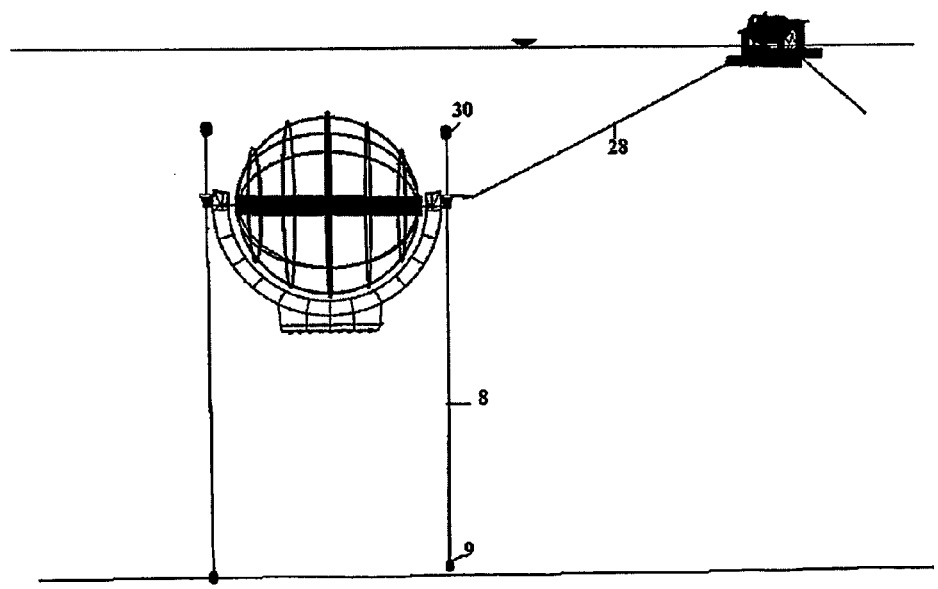
Figure 33:
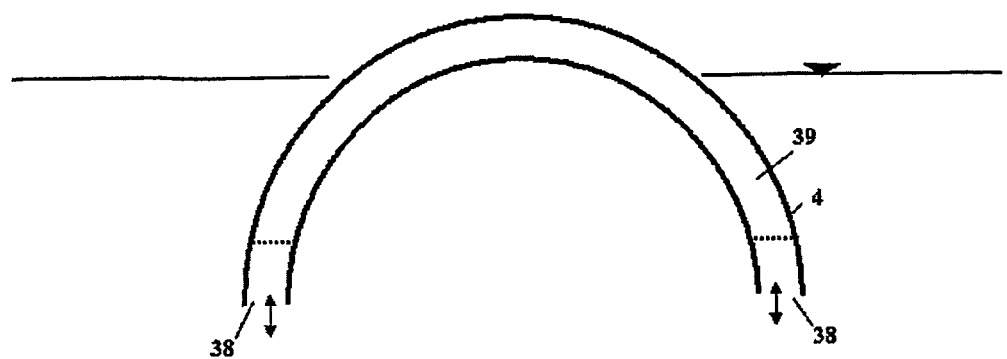
FIGS. 33 and 34 show the principle by which the tie bars 4 are supposed to provide for the stability of the installation. Seven of the tie bars have three openings 38 and 40 through which air and water may pass, whereas one tie bar only has two openings 38. When the installation is being submerged, the stay having only two openings is the topmost one and is located in the center, see FIG. 4. This stay will, when the netpen is submerged, capture air in an air pocket 39, as shown in FIG. 33. Inside the other seven stays the water level will be equal to the surrounding water level, as shown in FIG. 34.

FIGS. 28-34 show how the stability of the structure is ensured in two operating positions; a surface position and a fully submerged position. The stability of the structure in the direction parallel with the center pole 5 is preferably provided for through adjustment of the center pole 5 and the positioning of the floatation devices 10, and the working deck 6. The working deck 6 is heavy, and consequently, being suspended underneath the netpen, will result in a low center of gravity for the structure. Adjustment using air and water in the center pole 5 ensures that the structure exhibits a slightly negative buoyancy. The entire structure then will be supported by the reserve buoyancy of the buoys. During extreme conditions, the netpen will be let deeper down in the water. The netpen will then be supported by the reserve buoyancy of the additional floatation buoy 23 and of the energy station 30, as shown in FIG. 30. Alternatively, the stability in the direction parallel with the center pole 5 could be provided for by two weighting organs 9 suspended below the netpen, on extended lines 8. When the installation has a slight negative buoyancy, it will sink downwardly until the weighting organs 9 land on the sea floor. The weight load on the netpen is then reduced, and the netpen stabilizes at a particular depth. The length of the line 8 may be adapted to the particular depth at which it is desired to stabilize the netpen in the fully submerged position. The stability in the transverse direction of the center stay is ensured by that the tie bar 4, which is located on top and in the center, only has two openings 38, FIG. 33 and FIG. 4.

Figure 34:
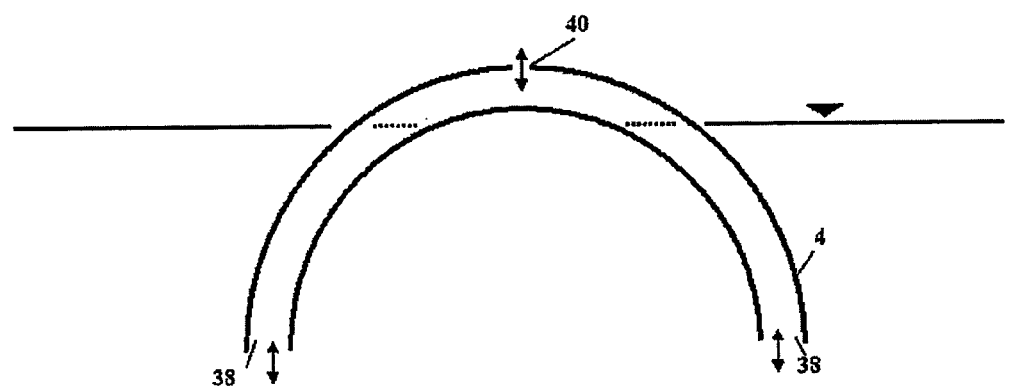

During the lowering from the semi-submerged position to the surface position or the fully submerged position, this stay will capture air in a pocket 39, whereas the other stays will be filled with water (FIG. 34). The stay having the air pocket 39 then will serve as a floatation body and result in a restoring moment for the netpen.

Round the netpen there is mounted a working platform 6, FIGS. 1-4 and FIGS. 8-9. The working platform 6 consists of a truss, preferably made of steel, and at the top side a flat covering or deck of steel grating is provided. However, both the truss and the grating may be made of another material than steel, such as polyethylene or a composite material. At the docking station 7 and the working platform 6 there are provided bollards and fenders 17, among other things, for obtaining a satisfactory mooring of boats, as well as hand railing and emergency ladders for personnel (not shown in the figures).

Figure 15:
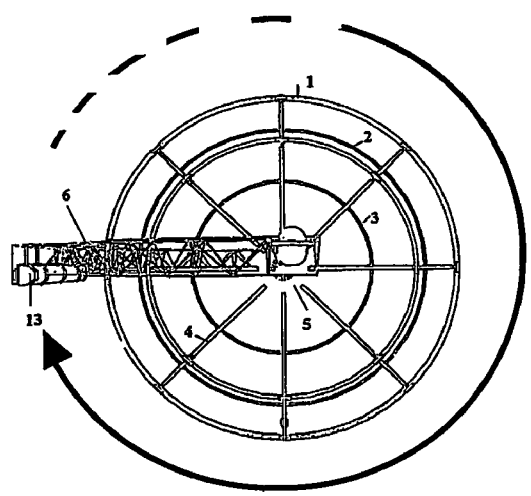
FIG. 15 is a side view illustrating rotation of the netpen inside the working deck 6.
Figure 16:
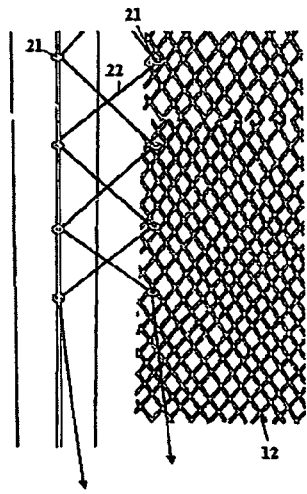
FIG. 16 shows a possible solution for attaching the seine 12 to the framework.

The working platform 6 preferably is horseshoe-shaped, but may also be extended to become a circle. The platform is attached to the netpen at only two permanent fixation points 16 (FIGS. 8-11 and 13), so that the netpen can be rotated inside the working deck. The attachment occurs in that an axle 15 being mounted on the terminal unit 14 of the center pole is guided into a bearing 16, such as a slide bearing, on the working platform 6. The rotation of the netpen can then be accomplished by pushing the netpen structure around when it is only attached at two opposing bearings 16, see FIGS. 8 and 15. The actual rotation occurs in that a motor or hand crank and a transmission are attached to the working deck and engage the toothed wheel 18 on the terminal unit 14 of the center pole 5, FIG. 10. In normal operation, when the netpen is not to be rotated, the working platform 6 will hang vertically and thus be located underneath the netpen. The positioning of the working platform relative to the netpen is determined by the floatation stay 13, which in the preferred embodiment is a tube. This tube comprises chambers, allowing the buoyancy to be adjusted using water and air.

Figure 22:
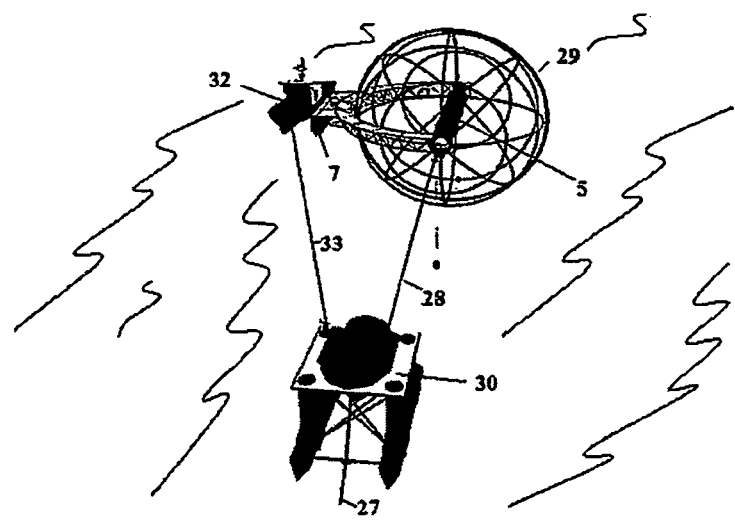
FIG. 22 shows how the energy platform 30 in the preferred embodiment of the invention is positioned relative to the netpen 29 and a moored vessel 32.
Figure 23:
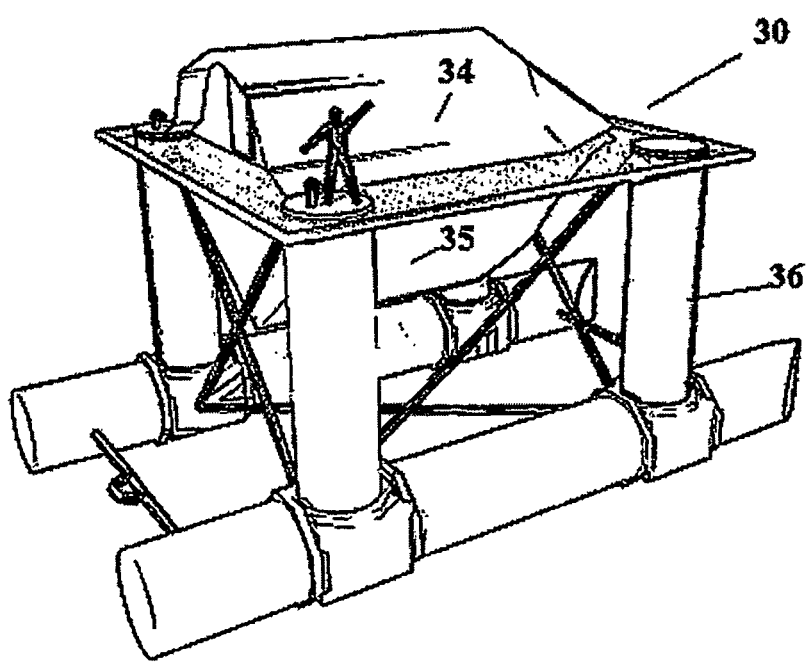
FIGS. 23 and 24 are a view seen diagonally from behind and a front view, respectively showing a possible design of the energy platform 30.
Figure 24:
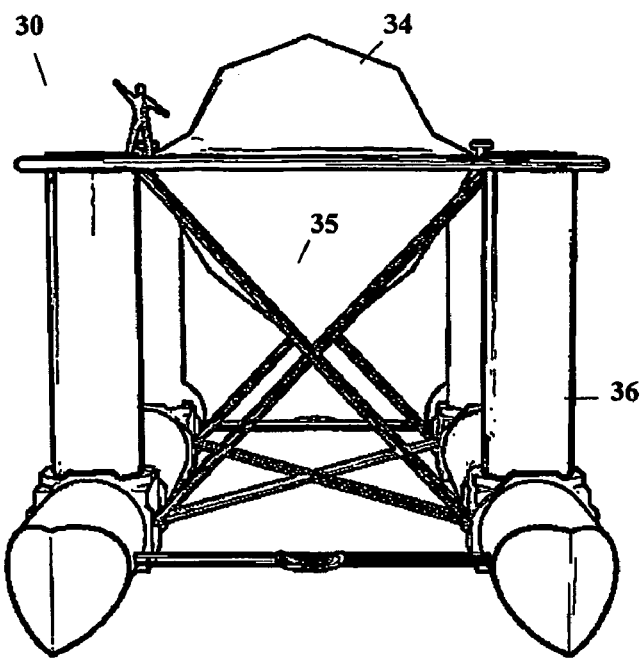

So that the personnel shall be able to get from a vessel to the working deck, the working platform 6 is equipped with a docking station 7. The positioning of the docking station relative to the netpen and the energy platform 30 enables an easy and safe docking of vessels 32 to the working platform, even in relatively rough sea, FIG. 22. The vessels will attach a long mooring 33 to the energy station 30 and lie parallel with the center pole 5 and the docking station 7, while at the same time the vessel 32 is moored to the working platform 6 and the docking station 7. This mooring approach ensures that the bow of the vessel 32 is facing any waves and currents. In addition, the contact and force transmission between the vessel and the netpen will be minimized, which reduces the chance of conflicts and damage.

Figure 17:
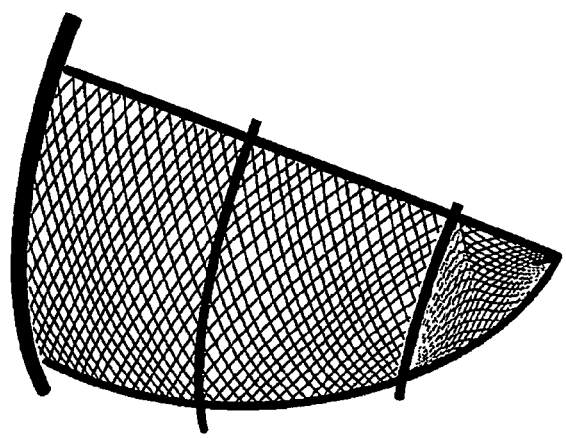
FIG. 17 shows a possible design of three different netpen modules that may be used for covering the netpen with a seine.
Figure 18:
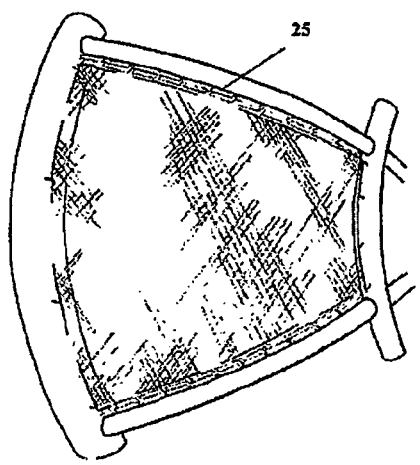
FIG. 18 shows a possible attachment of the netpen modules to the framework, wherein the modules can be attached by means of a rail system 25 in the different windows of the netpen framework.
Figure 19:
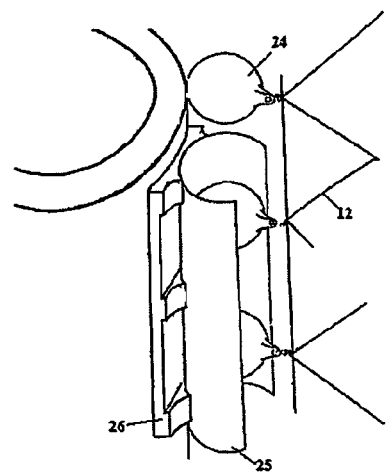
FIG. 19 is a rough detail drawing showing how the seine attachment can be implemented using balls 24 and cut cylinders 25, and how these can be attached to the netpen framework by way of a coupling plate 26.

The fish is kept enclosed in the netpen by covering the framework by means of a seine or a grating 12 (FIGS. 2 and 16-19). In the following, mention made of seine or seine modules preferably refers to seine made of polyamide synthetic fiber materials, even though other materials, such as other synthetic fiber materials or metal or plastic gratings, shall not be excluded. A possible solution for the seine of the netpen is as follows: Several seine modules are used for covering the framework. The various stays define a number of windows in the framework. FIG. 17 shows the different seine modules that can be used for covering the entire framework. In this case three different seine modules are provided, but other module divisions are possible. For example, these three modules may form one module. The attachment for the seine module is preferably accomplished by means of a system comprising plastic rings 21, rope 22, and zip-fasteners. Along all the stays in the framework, a rope 22 is attached having plastic rings 21, and in the seine modules there are also attached plastic rings, through which plastic rings a rope is threaded, FIG. 16. When tightening the rope, the seine modules will be strapped and fastened to the framework. In order to cover the gap between the framework and the seine, the seine modules are provided with a zip-fastener along their edges. Thus, the seine modules of different windows can be attached to each other by means of a zip-fastener. An alternative attachment for the seine modules is a rail system 25 attached to the stays in the framework and balls 24 attached to the seine modules. FIG. 19 shows how these balls 24 may be threaded into a cut cylinder 25, and thereby help keeping the seine fixed and outstretched. Said balls 24 preferably are compact balls made of polyethylene, whereas said cylinder 25 preferably is made of metal. Polyethylene is preferred for the balls due to its low cost and maintainability. The cylinder must be able to withstand friction wearing. The cylinder is attached on the side surface of the stays in each window by means of a connector plate 26, as shown in FIG. 19, and may be fixed to the framework by welding, bolting, or clamping. The rail system for attachment of the seine is preferably realized by mounting in each window several cylinders 25 (FIG. 18) spaced some distance apart, which distance is sufficiently small to prevent the balls 24 from dropping out. This will make the rail system more flexible and allow for larger deformations. It is also possible to use an entire rail in each window. The rail system may be adapted to any possible design of the above seine modules. Moreover, the rails do not need to be attached at the side surface of the stays in the framework, but may also be located at the front surface or at the back surface thereof.

Figure 20:
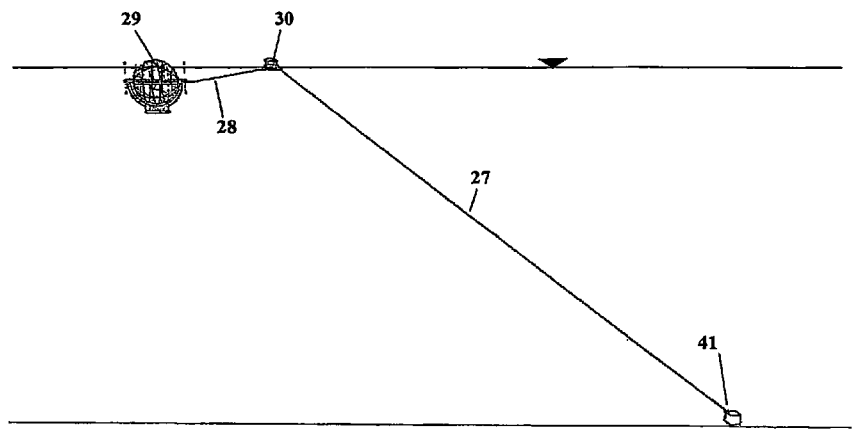
FIG. 20 shows a principle drawing for a sway-anchoring, wherein 29 is the netpen, 30 is an external floatation unit, 28 is the uppermost part of the anchoring line, 27 is the lowermost part of the anchoring line, and 41 is the anchor.

FIG. 20, as well as FIGS. 22-24 and 28-32, show an energy station 30 moored to the netpen 29 in one end and to an anchor in the other end. The energy station 30 contains, among other things, a huge fodder container 35, air compressor, aggregate, monitoring equipment, and a haunt 34 for the personnel. Extending alongside the anchoring line from the energy platform 30 to the netpen 29, a lifeline 28 carries fodder, information, air, and energy. The fodder tube runs to one or more feeding points, preferable located high up on the streamside of the netpen, against which incoming currents first hits, but other feeding points are possible as well, such as at the top of the sphere.

Various anchoring systems may be used. One possible approach is the use of a so-called sway anchoring as shown in FIG. 20, wherein the installation 29 is allowed to move freely about a single anchor 41. The anchoring line 27 and 28 can be attached to an energy station 30, or to a buoy or another floatation device that ensures that the anchoring forces is transferred to the installation as horizontally as possible. The horizontal part 28, as well as the vertical part 27 of the anchoring line may be subdivided into multiple single lines. Another possible anchoring approach is to make use of two or more main lines (two or more anchors) in the same or substantially the same manner as said sway-anchoring alternative. In that case the installation would not be able to move freely all the way around the anchors. A third anchoring approach that could be used is a so-called tension leg anchoring. One could then use four anchoring lines, for example, each attached to a separate anchor.

For anadromous fish species and marine breeds that thrive best in the upper water layers, only about 1/10 of the netpen volume will be located above the water surface in the normal floating position. For breeds that thrive better on deeper water, the netpen may be stabilized fully submerged at a desired depth, and this position then defines the normal floating position of the netpen. The netpen may be adapted for a desired depth through adjustment of the amount of water in the center pole 5 and through adjustment of the line lengths 28 and 42, and possibly 8. The buoys, which are attached to said lines 8, provides for practically all the reserve buoyancy of the netpen in the normal floating position. Regardless of the carried species, the netpen, when required, for instance during maintenance work or harvesting, may be elevated to a semi-submerged or approximately semi-submerged floating position by pumping air into one or more chambers in the center pole 5 in order to expel any water therein.

The installation may be elevated to a semi-submerged position by pumping air into the center pole 5 either through one or more tubes originating from the external platform, alternatively from a boat at the surface, or directly from air accumulators located on the netpen. When the installation is used for open sea fish farming outside the skerries, the netpen usually will have a large volume, e.g. 25000 m$^3$, which corresponds to a diameter of approximately 36 meters, or 40000 m$^3$, which corresponds to a diameter of approximately 42 meters. However, various adaptions to the application (breeding, storage, and transport) and operation site (open sea versus more sheltered areas) may result in a netpen volume that is greater or lesser than the above volumes. The initiation of the elevation or lowering of the installation may be triggered automatically or manually from the netpen or from an external platform or another floatation body, but may also be remotely controlled from an onshore facility by means of a bi-directional radio or satellite communication, for example. In addition, through such communication system, information from sensors and cameras on and nearby the installation may be transferred to the platform and/or to an onshore facility, which allows a high degree of long-distance monitoring of the installation and the fish.

Figure 14:
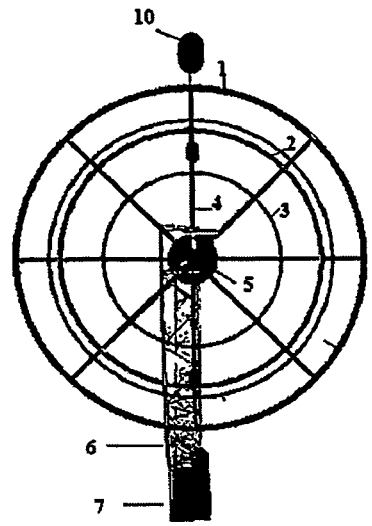
FIG. 14 is a front view showing the netpen in an operative position (surface position or fully submerged).

When the installation is in a semi-submerged position, the working deck 6 serves as a working platform on which personnel can reside for carrying out work operations on the seine, inspection of the installation and the fish, gathering of dead fish, replacement of seine modules, replacement of structure parts, and other tasks, see FIGS. 1-4, 21-22, and 25-27. Before the working deck may be used by personnel for operations on the installation, it must be lifted from a submerged position underneath the installation (FIGS. 13 and 14) to a surface position (e.g. FIGS. 1-4). This is accomplished by emptying one or more chambers in the buoyancy controllable stay 13, which may be a tube, for example, of water using pressurized air. When the installation is lowered down from the semi-submerged floating position, also the working deck 6 will be lowered down as the chambers are refilled with water.

The rotatability of the netpen will be made use of frequently in performing the various work operations. Hence, the rotation is important, and is made possible as a result of that the netpen is only fastened at two opposing, permanent fixation points 14 integrated as part of the center pole 5, see FIGS. 7-11 and 13-14. The actual rotation can be accomplished, for example, by integrating a rim 18 in the terminal unit 14 and connecting a motor to this rim through a gear. In order to reduce the force that must be applied to the terminal units 14 for rotating the netpen, it may be advantageous to make buoyancy controllable one or more of the stays in the netpen framework, in which case the stays may be comparted into one or more chambers. Then, when the netpen is to be rotated, some of the chambers can be filled with water, whereas other chambers, that already may be filled with water, is emptied of water.

The installation according to the present invention may be adapted for two in principle different requirements regarding level of technology and extent of automation—a high-tech installation and a moderate or low technology installation. In the high-tech case, the monitoring and adjustment of the installation will be a central task, and a number of sensors and cameras will be located around the installation, both below as well as above the water surface. All important data, as well as camera images, can be transferred via radio, satellite, or a wired connection to the platform or some other floatation unit nearby the installation, or to an onshore facility from which personnel can monitor the installation on a regular basis. When critical values are detected for one or more of the measured parameters, it is possible for the installation to automatically initiate submersion and other operations, while at the same time alarms are being triggered. However, in all normal operation it is assumed that personnel arrive at the installation by boat and carry out the operations, either at the installation, from the platform, or by connecting to relevant tubes/cables in the lifeline (fodder, energy, air, communication link/data cables) from a boat. The different tubes and cables in the lifeline of the netpen may be disconnected both at the netpen side and at the platform side, allowing the cable and tube sections between the netpen and the platform to be individually replaced. The moderate or low technology installation will be less automated, having a correspondingly higher need for manual intervention.

Figure 21:
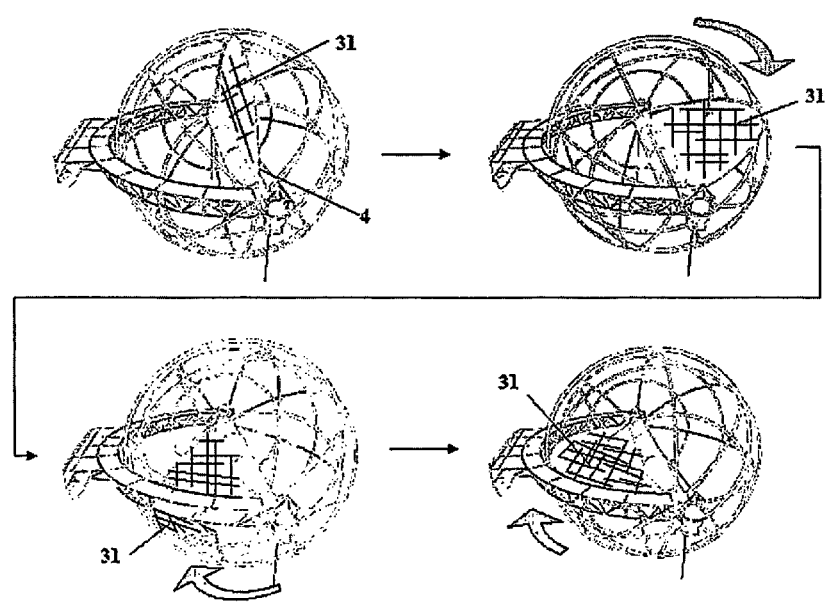
FIG. 21 is a principle drawing illustrating how harvesting or sorting of fish can be carried out by mounting a seine or grating 31 in the netpen cross-section located above the water surface, and subsequently rotating the netpen.

FIG. 21 illustrates a method that may be used for harvesting the fish. The netpen is first elevated to a semi-submerged state. Thereafter, a seine 31 is attached on the inside above the cross section located above the water surface. The seine covers the entire (semi) cross section. When the netpen is rotated, the fish is trawled with the seine 31 and gathered together. The fish may then be raked or sucked aboard on a vessel, possibly assisted by a tunnel system through which the fish is forced to swim when the volume is reduced. A seine may also be used that does not cover the entire above water cross section, and that therefore does not gather up all the fish. A displacement medium other than a seine may also be used, such as a lattice. In addition, a sorting screen may be installed, so that fish below a certain size will not be harvested.

The present invention consists of several parts, each part, including one ore more characteristic features, forming the core in each invention. Polyethylene is of vital importance in the invention, and is not chosen by chance. Polyethylene, or polythene which is the correct name, is a thermoplastic, or more exactly, a synthetic polymer, which is formed through a polymerization process wherein several ethylene molecules joins to form long molecular chains. Thermoplastics are characterized in that they become soft and easily mouldable when heated. The plastic recovers its original properties when cooled down to normal temperature. Polyethylene is available in various qualities. PolyEthylene Low Density (PELD) is soft and flexible. PolyEthylene High Density (PEHD) is harder and more stable, having a higher density (0.94-0.97 g/cm³). In selection of material, properties like density, yield point, elasticity module and fatigue resistance/strength, are important. Polyethylene, and especially PEHD, is excellent in this manner. They possess a favorable density, extremely high strength in proportion to weight, high flexibility, and outstanding fatigue resistance. Moreover, the material has approximately the same compressive strength value as tensile strength value, and it is inexpensive and easily workable. Polyethylene is not a new material in connection with fish farming; it has been used within this industry for many years. However, the use of this material in marine structures in general, and in fish farming installations in particular; has been very limited. As construction material for fish farming installations, the use of polyethylene has largely been limited to one or more horizontal floatation rings at the surface, from which a seine is freely suspended. For other marine structures, the perhaps most important use of polyethylene has been as material in pipelines for water and discharge. In addition, the material has been used in some smaller rescue boats, oil booms, etc. However, polyethylene has not previously been used as construction material in large offshore structures, which is the case in the present invention. Analyses and several model experiments has indicated that the material is well suited for the purpose, both with respect to strength related and practical considerations relevant to the fish and the personnel. The practical considerations include, for example, the influence of the material on the response of the netpen, the maintainability and workability of the material, and its cost, which are all considerations of particular importance to such offshore structures. Thus, the results from analyses and testing of the present invention regarding the use of polyethylene as framework material may be particularly interesting for larger manufacturing companies and the shipbuilding industry, wherein many actors, especially in high-cost countries, suffer from low influx of orders related to conventional steel industry.

The center pole 5 and its function both as a load bearing member for the structure and as an adjustable floatation element for elevating and lowering the netpen, is also an essential feature of the present invention. The center pole preferably is made of steel, which is due both to its purpose, its positioning, and its disposition to a simple configuration using standardized components. In particular, it is emphasized that the center pole most of the time will be located well protected from the cyclic and fatigue-promoting wave forces at the surface since the normal floating position of the netpen is almost fully or fully submerged, and also that steel can be a well suited material for essential constructional elements, also in terms of cost, as long as they can be protected from large, cyclic wave loads and to a great extent be standardized with respect to dimensions, shape and assembly effort.

Essential in the present invention is that the combination of design and construction materials is chosen so that the netpen as far as possible will conform to the natural forces instead of resisting them. By this is meant a flexible and movable installation which to a significantly greater extent than rigid and heavy installations, such as steel installations having a large half breadth area, follows the water movement, and which is designed in such a manner that it resists large deformations, that the relative load is smaller, and that forces are distributed symmetrically in the structure. Model experiments have shown that the netpen largely conforms to the above. In this connection, it should be mentioned that a steel implementation of the netpen framework could more than double the overall weight of the netpen, which would significantly reduce its response, leading to a correspondingly greater relative movement between the netpen and the fish, which is unfavorable for the fish. In addition, the netpen would then be much more susceptible to fatigue due to the steel stays located in the wave zone.

None of the main problems commonly encountered in the previous attempts at open sea installations is found in the present invention; this is also demonstrated through the above referred to model experiments of this netpen and through the figures and explanations in the description herein. Such main problems include exposing the fish to stress and injury due to the large relative movement between the installation and the sea in waves, large volume reduction of the netpen due to large deformations of the seine in rapid currents, failure of the supporting structure due to fatigue, with a subsequent full or partial collapse, as well as severe problems with accessing the installation for vessels and personnel and the ability of the personnel to reside on the installation in order to carry out the work, inspections and maintenance.

The invention claimed is:

1. A netpen for breeding, storage, or transport of fish, the netpen comprising:
   a flexible framework of stays mainly composed of polyethylene materials containing fibers;
   a substantially horizontal center pole extending through the netpen and having sufficient stiffness to serve as an attachment and supporting structure for the netpen, and wherein the center pole further serves as a buoyancy adjusting element for the structure through the adjustment of an amount of water and an amount of air in the center pole; and
   a substantially horseshoe-shaped truss with a working deck attached at each end of the center pole, so that the truss with the working deck may be used as a platform or haunt to support personnel performing work operations on the netpen when the installation is in a semi-submerged or substantially semi-submerged floating position, a docking unit extending from the substantially horseshoe-shaped truss, wherein the docking unit includes a plurality of truss members, a plurality of fenders, and at least one element for adjusting the buoyancy through adjustment of the amount of water in the at least one element, so that the entire horseshoe including the docking unit is arranged for being lowered to a position underneath the netpen, wherein:
      the netpen is lowerable into water when needed,
      the netpen is moveable between a semi-submerged state for the performance of one or more work operations and a fully submerged state,
      the netpen has the shape of a substantially dual curved body and is rotatable about a substantially horizontal axis, and
      the substantially horizontal axis remains substantially horizontal in both the semi-submerged state and in the fully-submerged state.

2. The netpen of claim 1, wherein the framework further comprises a certain amount of at least another material.

3. The netpen of claim 2, wherein the constituent parts comprises a fiber material.

4. The netpen of claim 3, wherein the fiber material comprises carbon fiber.

5. The netpen of claim 1, wherein the netpen is sway anchored.

6. The netpen of claim 1, wherein the netpen is tension leg anchored.

7. The netpen of claim 1, further comprising an external platform serving as a storage of life-supporting functions, said functions being transferred to the netpen through tubes constituting one or more of the netpen lifelines.

8. The netpen of claim 1, wherein the netpen has a substantially oval shape, or a substantially spherical shape.

9. The netpen of claim 1, wherein the netpen has a substantially cylindrical intermediate section.

10. The netpen of claim 1, wherein the framework is covered by a seine formed of seine modules or a grating formed of grating modules, wherein each seine or grating module covers a separate window, each window being defined by the stays that constitute the framework.

11. The netpen of claim 10, wherein the attachment of the seine modules is accomplished by means of rails attached to the stays of the framework and rail engaging members mounted along the edge of the seine module, the rail engaging members being threaded into the rails for keeping the seine module outstretched.

12. The netpen of claim 10, wherein the attachment of the seine modules is accomplished by mounting rings along the edges of the stays and the seine, wherein a rope is threaded through these rings and tightened so that the netpen is completely or almost completely enclosed by the seine, wherein excess seine along the sides of each seine module are folded back over the connection and attached in a zip-fastener embedded in the seine, so that the netpen is completely enclosed by the seine in order to prevent the fish from escaping.

13. The netpen of claim 1, wherein the polyethylene material comprises polyethylene low density (PELD) or polyethylene high density (PEHD).

14. A netpen for breeding, storage, or transport of fish, the netpen being lowerable into water when needed, the netpen being liftable to a semi-submerged state for the performance of one or more work operations, and the netpen having the shape of a substantially dual curved body and being rotatable about a substantially horizontal axis, the netpen comprising:
    a flexible framework of stays mainly composed of polyethylene materials;
    a substantially horizontal center pole extending through the netpen and having sufficient stiffness to serve as an attachment and supporting structure for the netpen, wherein the center pole further serves as a buoyancy adjusting element for the structure through the adjustment of an amount of water in the center pole;
    a substantially horseshoe-shaped truss with a working deck attached at each end of the center pole, so that the truss with the working deck may be used as a platform or haunt for personnel performing work operations on the installation when the installation is in a semi-submerged or substantially semi-submerged floating position; and a docking unit extending from the substantially horseshoe-shaped truss, wherein the docking unit includes a plurality of truss members, a plurality of fenders, and at least one element for adjusting the buoyancy through adjustment of the amount of water in the at least one element, so that the entire horseshoe including the docking unit is arranged for being lowered to a position underneath the netpen.

* * * * *